UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

SILICON-CARBID ARTICLES.

1,172,659.  Specification of Letters Patent.  Patented Feb. 22, 1916.

No Drawing.  Application filed September 17, 1912. Serial No. 720,871.

*To all whom it may concern:*

Be it known that I, THOMAS B. ALLEN, a resident of Niagara Falls, Niagara county, New York, have invented a new and useful Improvement in Silicon-Carbid Articles, of which the following is a full, clear, and exact description.

My invention relates to shaped abrasive or refractory articles made up with a binder; and is designed to provide an improved article of this character.

To that end it consists in a new and useful binder for use in fabricating abrasive or refractory articles, as well as in the resulting article and the process of manufacture with such binder.

Heretofore in the manufacturing of abrasive refractory articles, such as those consisting of silicon carbid and a ceramic binder, it has been customary to use a binder consisting largely of feldspar. The feldspar has usually been admixed with kaolin, flint, or other ceramic material in order to improve the physical and abrasive properties of the articles. It has been found, however, that in all cases where silicon carbid is agglomerated with a binder containing feldspar, there is a chemical reaction between the chemical constituents of this substance and the silicon carbid. Many conditions determine the extent to which this reaction takes place, such as relative proportion of silicon carbid and bonding material, fineness of grain of silicon carbid, presence or absence of surface impurities on the silicon carbid, fusibility of the bonding material, and kiln conditions during the vitrification of the bonding materials including the temperature and constitution of the kiln gases. The different conditions do not initiate new reactions; but simply affect a reaction which is always present with such binder. By this development of the reaction between the constituents of the spar and the silicon carbid, the contact between the silicon carbid grains and binding material may be destroyed, or seriously affected, the result being that the article does not possess in high degree the physical properties which make it durable and economical in grinding operations. Further, owing to the different conditions which can accentuate or catalyze this reaction, the manufacture of this class of articles—notwithstanding their merit when properly made—is attended with very grave difficulties. I have discovered that all these difficulties are overcome by using a binding material for making silicon carbid articles, the constituents of which do not react chemically with silicon carbid at the vitrification temperature of the binder.

As an example of my invention, I will now describe a preferred method of using magnesium aluminum silicate as the bonding material, this being inert toward silicon carbid at the vitrifying temperature of the silicate. I take a mixture of 30 parts by weight calcined magnesia, 55 parts by weight kaolin and 15 parts by weight flint. These ingredients, all in powdered form, are thoroughly mixed and can further be advantageously sintered and the sintered material finely ground, in order to prepare an adequately intimate mixture. I then take 25 parts by weight of this finely powdered mixture and intimately mix it with 75 parts by weight of silicon carbid grains of desired fineness. To this mixture is preferably added a temporary binder such as a solution of gluten and then the article of the desired shape is molded or pressed from this mixture. The molded article is now placed in a ceramic kiln and subjected to a temperature of approximately 1400° C. and until the binding material has undergone vitrification, resulting in a strong and durable article having in high degree the physical properties desirable in grinding implements.

The advantages of my invention result from the improved character of the product; as well as the simplicity and cheapness of the method.

Other materials may be used as the binder, without departing from my invention; and it is possible and often desirable to use boric acid in the bond, this material being advantageous in increasing the fusibility of the bond.

Other changes may be made without departing from my invention.

I claim:—

1. A silicon carbid article, having a vitrified bond consisting of magnesium aluminum silicate, and free from material which reacts with carborundum at the vitrifying temperature of said bond.

2. A silicon carbid article, having a vitrified bond containing magnesium aluminum boro-silicate, and free from material which reacts with carborundum at the vitrifying temeprature of the said bond.

In testimony whereof, I have hereunto set my hand.

THOS. B. ALLEN.

Witnesses:
H. C. COXE,
JOHN BAKER.